UNITED STATES PATENT OFFICE.

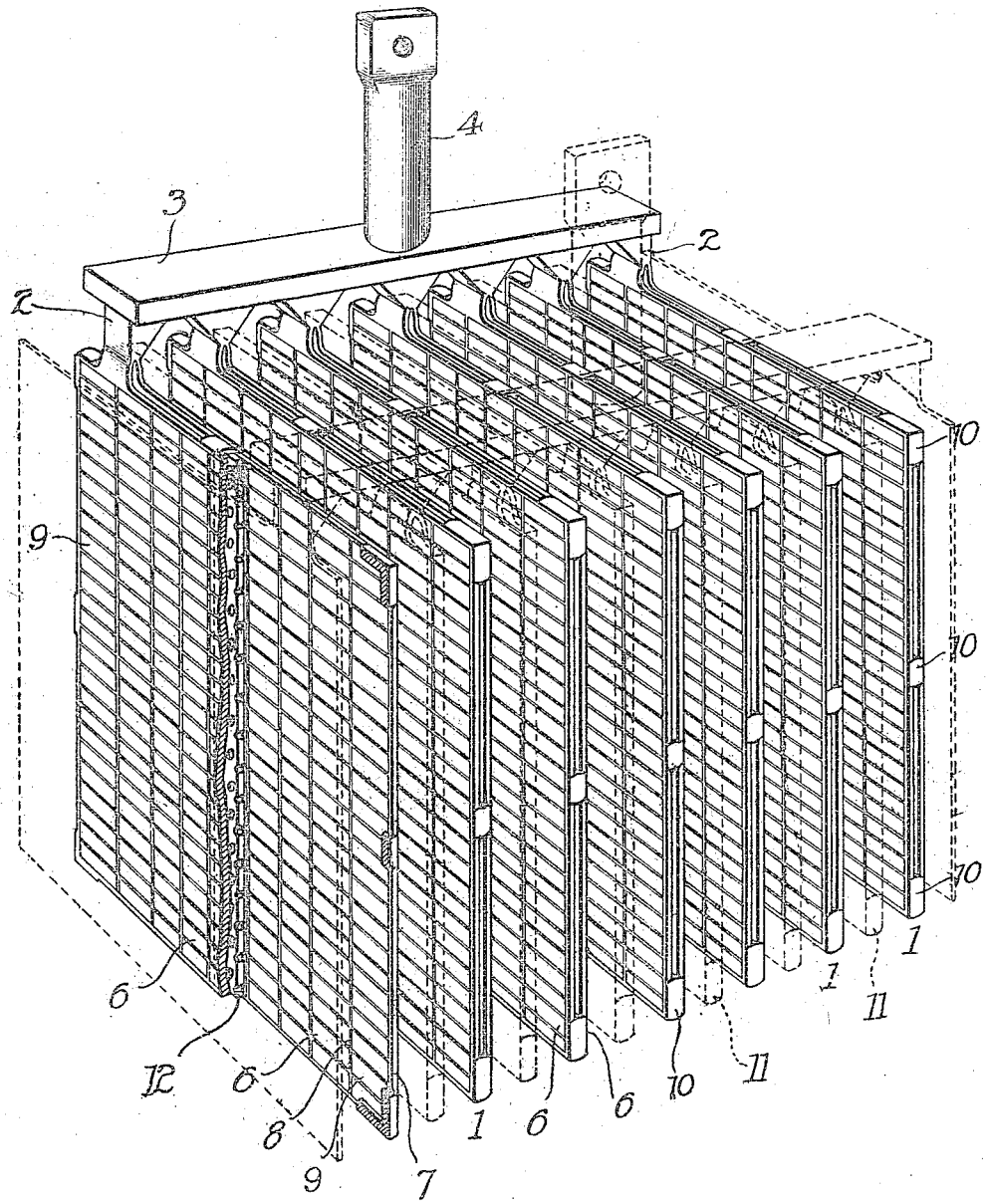

RUFUS N. CHAMBERLAIN, OF CHICAGO, AND SIDNEY J. HALL, OF HINSDALE, ILLINOIS, ASSIGNORS TO GOULD STORAGE BATTERY COMPANY, A CORPORATION OF NEW YORK.

ELECTRODE.

1,075,897.  Specification of Letters Patent.  Patented Oct. 14, 1913.

Application filed December 6, 1912. Serial No. 735,294.

*To all whom it may concern:*

Be it known that we, RUFUS N. CHAMBERLAIN and SIDNEY J. HALL, citizens of the United States of America, and residents of Chicago, county of Cook, and State of Illinois, and Hinsdale, county of Dupage, and State of Illinois, respectively, have invented certain new and useful Improvements in Electrodes, of which the following is a specification.

In storage batteries of the general type to which this invention relates, the active material should be submerged in the electrolyte which as far as possible should be maintained at substantially uniform density throughout. Lack of uniformity in density results in clogging the pores of the plates with sulfate, because the exhausted electrolyte in the interior cannot diffuse with the fresh electrolyte as readily as that on the exterior of the plate.

Discharge requires the abstraction of a portion of the chemical constituents from the electrolyte imprisoned in the pores of the plates. Without circulation of the electrolyte the current available is small and the cell will become apparently discharged. After the cell has stood the electrolyte diffuses into the plate and the cell is again active, the delayed discharge being called the residual discharge. Any construction or arrangement of parts which facilitates and induces permeation, percolation, circulation, and diffusion of the electrolyte through and around the active material and throughout the cell increases the efficiency and capacity by rendering all of the material uniformly and continuously effective, and by preventing the formation of sulfate. Prompt and continuous displacement of exhausted electrolyte by fresh and strong electrolyte at the points of chemical action throughout the body of the active material largely prevents the setting up of counter electro-motive forces which tends to oppose the normal flow of current. The better the circulation of the electrolyte around and through the active material the more perfect will be the action of the battery and the less will be the fall of the voltage curve upon and throughout the discharge of the battery. A forced or a gravity circulation, which will provide an increase in the quantity of the electrolyte reaching the plate, will increase the output of the cell on continuous high rate discharge, and will also tend to prevent clogging of the pores in the plate by the unequal formation of sulfate of lead on the active part of the plate.

The main objects of this invention are to provide an improved construction and arrangement of the electrodes of storage battery elements whereby better diffusion of the acid may be had so as to enable a greater discharge to take place from the active material of the plates, and whereby the active material may be kept in better physical condition by reducing in amount the variation of acid density in the interior of the active material of the plates; and to provide means for producing circulation of the electrolyte without the use of mechanical means, such as circulating pumps, and without materially increasing the cost of the installation. These objects are accomplished by the construction shown in the accompanying drawing, which shows a perspective view of a group of storage battery electrodes embodying this invention. The electrodes of one polarity are shown by full lines, and those of the others are shown dotted.

In the construction shown in the drawing, each electrode comprises a series of double plates 1 arranged in parallel relation to each other, and provided with suitable lugs 2 connected in the usual manner by a cross-bar 3, which in turn is provided with an upstanding strap or terminal 4. Each of these double plates is made up of two plates 6, which may be of any suitable construction and which are secured close together in substantially parallel relation to each other. The plates 6 are shown in the form of open style or perforated grids having their spaces filled with paste or formed blocks of active material 9. Each pair of plates 6 is secured together by narrow strips 10 of lead called "lead burns," which are so spaced as to leave large channels between them for the circulation of the electrolyte. Each block of active material 9 in the several perforations or openings of the grid has one face presented to the electrolyte between the component grids 6, and its opposite face presented to the electrolyte with which the electrode is surrounded.

It will be seen that each pair of plates 6 is in effect a single plate having an internal cavity for the circulation of electrolyte between and substantially coextensive with the external active surfaces. This internal space is open around substantially the entire perimeter of the electrode, the only obstructions being the narrow "lead burns" by means of which the edges of the two plates are connected. The electrode 11 may be of the usual single plate construction, or may also be made up of double plates similar to the plates 1.

Where the component plates 6 are of large area they may be spaced apart inward of their edges by narrow spacer strips, such as are illustrated at 12 in the drawing. In practice hard rubber has been used for this purpose, but as the plates which they separate are of like polarity it is not essential that these strips be of insulating material. They should, however, be so arranged as not to interfere with the free circulation of the electrolyte between the component plates of the electrode.

The operation of the device shown is as follows: The chemical action occurs between the adjacent opposing surfaces of plates of opposite polarity, that is to say, the active surface of any plate 6 is that which is directly opposed to the opposing surface of the adjacent plate 11 and vice versa. During the discharge the active material is gradually converted into sulfate of lead by the electrolytic action, and at the same time water is formed which lowers the gravity of the acid adjacent to the active surface of the plate and in the interior of the active material. It is important that this water be carried away by circulation of the electrolyte so as to allow the stronger sulfuric acid of the electrolyte to come into contact with the active material. This is accomplished in our approved electrode by diffusion of the stronger acid on the outside with the acid which has become weakened by the electrolytic action.

Ordinarily single plates, when discharging, are discharged at both surfaces at the same time, and the acid in the active material of the plate is being diluted on both sides by the electrolytic action. Under such circumstances the diffusion of the weak acid with the strong acid is much slower than is the case with the hereindescribed double plates; where each plate or mass of active material has but one side exposed to the electrolytic action, while the other side is exposed to strong acid which enters into and permeates the pores of the active material through which it percolates outwardly and thereby not only diffuses with and carries away the weaker acid from the active side and interior of the plate but also supplies fresh strong acid throughout the interior of the active material from the inner reservoir of acid provided by the space between the double plates. This produces greater and quicker diffusion because the indefinite masses of diluted acid, if they may be so termed, are of less extent and have a correspondingly greater surface exposed to and in contact with the stronger acid.

As the capacity of the plates largely depends upon the strength of the acid in direct contact therewith, and therefore upon the rapidity with which the acid is diffused, it is apparent that a decided gain in capacity is obtained. This more rapid diffusion insures that the variation in acid density, throughout the extent of the surface of the active material, is less than is the case in usual constructions, and this tends to lessen the local action, disintegration, and chemical wear on the active material.

The following explanation appears to account for the increased circulation, the improved diffusion of the electrolyte, and the corresponding increase in capacity and increase in the discharge rate of a battery equipped with the herein described double plate construction. During the electrolytic action in discharging the water formed on the active surfaces and in the interstices of the active material of the double plate, dilutes the acid and thereby reduces its density. The acid in the circulation space in the interior of the double plate is, however, of full strength and has correspondingly greater density. The differential gravity of the columns of liquid immediately adjacent to the inner and outer surfaces of the active material, therefore, sets up a circulation in the electrolyte, the direction of which is upwardly along the outer or active surfaces of the double plate and downwardly along the inner or inactive surfaces of the double plate. Also the denser liquid on the interior of the double plate, by reason of its greater static pressure, forces its way through the active material, facilitating the diffusion of the electrolyte and carrying outwardly toward the active surface the weaker contents of the interstices of the material. Circulation and the corresponding mixing of the elctrolyte is present during both charging and discharging. As the chemical action during charging is the reverse of the action during discharging, sulfuric acid is formed in the interior of the plates instead of water when charging, therefore, a rapid charge will form very strong sulfuric acid in the pores of the active material, which tends to dissolve and otherwise weaken the material. By providing the additional diffusion channels in the back of the plates more rapid and thorough diffusion and percolation takes place, and the strength of the acid formed in and about the active material is accordingly kept down thereby, and the electrolyte rendered substantially uniform in density throughout. It is evident, therefore, that the double plate construction, or an equivalent arrangement which would provide acid circulation spaces behind the electrolytically active faces of the active material, produces greater capacity for the same size and weight of the elements, and also maintains the active material in better condition, thus largely increasing the life of the element.

A further advantage of the construction illustrated is that the double plate arrangement enables a greater number of plates to be installed in a jar or receptacle of given capacity, as the number of separators is reduced and, therefore, a greater space is available for plates, for example: In a cell of the regular single plate arrangement containing thirteen battery plates, sixteen plates of the same size can be substituted by the double plate method thus giving eight positives instead of six positives, which is a gain of 33⅓ per cent.

Although but one specific embodiment of this invention has been herein shown and described, it will be understood that numerous details of the construction shown may be altered or omitted without departing from the spirit of this invention as defined by the following claims.

For the purpose of distinguishing between the outside surfaces of the double plates and the inside surfaces these surfaces have been hereinbefore referred to as active and inactive surfaces respectively, and they will be so distinguished from each other in the claims but it is not intended that the word inactive shall be interpreted as implying complete absence of chemical activity. For the purpose of this specification and claims it may be assumed that the electrolytic action follows the most direct course between the positive and negative plates, and that therefore the "active" surfaces are the surfaces of one electrode which are directly opposed to an electrode of opposite polarity, whereas the "inactive" surfaces are those of the same polarity which are directly opposed to each other.

We claim:

A storage battery electrode of hollow construction comprising a pair of complementary perforated plates connected electrically in a substantially integral manner and disposed vertically in closely spaced parallel relation, providing a vertical interior circulation passage for electrolyte and adapted to constitute the interior portion of a circulation path when the plates are immersed below the surface of the electrolyte, in combination with active material held in and filling the perforations in said plates and adapted to facilitate ready percolation of electrolyte through said active material in charging and discharging, such percolation being induced by gravity acting upon the unbalanced inner and outer columns of electrolyte having different densities.

Signed at Chicago this 30th day of November 1912.

RUFUS N. CHAMBERLAIN.
SIDNEY J. HALL.

Witnesses:
EUGENE A. RUMMLER,
M. IRENE HUTCHINGS.

---

Copies of this patent may be obtained for five cents each, by addressing the "Commissioner of Patents, Washington, D. C."